(12) United States Patent
Togashi (10) Patent No.: US 7,324,327 B2
(45) Date of Patent: Jan. 29, 2008

(54) LAMINATED CERAMIC CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/670,528

(22) Filed: Feb. 2, 2007

(65) Prior Publication Data
US 2007/0211410 A1 Sep. 13, 2007

(30) Foreign Application Priority Data
Mar. 10, 2006 (JP) ............................. 2006-066040

(51) Int. Cl.
*H01G 4/06* (2006.01)
(52) U.S. Cl. ................ 361/321.2; 361/321.1; 361/311; 361/313; 361/306.1; 361/306.3
(58) Field of Classification Search .......... 361/321.2, 361/321.1, 311–313, 306.1, 306.3, 321.4, 361/321.5, 301.2, 301.3, 303, 305, 308.1, 361/308.3, 310
See application file for complete search history.

(56) References Cited

U.S. PATENT DOCUMENTS

| | | | |
|---|---|---|---|
| 6,034,864 A * | 3/2000 | Naito et al. | 361/306.1 |
| 6,452,781 B1 * | 9/2002 | Ahiko et al. | 361/321.2 |
| 6,496,355 B1 * | 12/2002 | Galvagni et al. | 361/306.3 |
| 6,594,136 B2 * | 7/2003 | Kuroda et al. | 361/306.1 |
| 6,729,003 B2 * | 5/2004 | Yokoyama et al. | 29/25.41 |
| 7,061,747 B2 * | 6/2006 | Togashi et al. | 361/306.3 |
| 2007/0064374 A1 | 3/2007 | Togashi et al. | |

FOREIGN PATENT DOCUMENTS

JP 2000-208361 7/2000

OTHER PUBLICATIONS

U.S. Appl. No. 11/670,528, filed Feb. 2, 2007, Togashi.
U.S. Appl. No. 11/670,525, filed Feb. 2, 2007, Togashi et al.

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

A laminated ceramic capacitor includes a body having an inner layer portion and an outer layer portion and a plurality of terminal electrodes spaced apart from each other in a length direction of the body. The inner layer portion has a plurality of internal electrodes stacked in a height direction of the body. The internal electrodes have led-out portions led out to a side face of the body. The outer layer portion is disposed on one of opposite faces of the inner layer portion in the height direction. The terminal electrodes are each provided with a connecting portion and a spreading portion. The connecting portion extends along the height direction to cover corresponding one of the led-out portions. The spreading portion has a width gradually increasing from one of opposite ends of the connecting portion in the height direction toward an edge of the side face.

20 Claims, 7 Drawing Sheets

LAMINATED CERAMIC CAPACITOR

BACKGROUND OF THE INVENTION

1. Field of the Invention

The present invention relates to a multi-terminal laminated ceramic capacitor with low ESL.

2. Description of the Related Art

Such laminated ceramic capacitors have been required to have ESL reduced with increase in frequency of electronic devices on which the capacitors are to be mounted. As means for realizing low ESL, Japanese Unexamined Patent Application Publication No. 2000-208361 discloses increasing the electrode width of terminal electrodes.

Recently, furthermore, the market demand for miniaturization of electronic devices has been rapidly increasing, and further miniaturization of laminated ceramic capacitors to be mounted thereon is also demanded in accordance with the technical trend.

Under normal conditions, however, the miniaturization necessarily reduces the width of terminal electrodes, contrary to the demand for low ESL.

In multi-terminal laminated ceramic capacitors on which many terminal electrodes have to be formed, moreover, if the electrode width of terminal electrodes is increased to realize low ESL, it will be difficult to ensure sufficient space for formation of the terminal electrodes on the side faces of the miniaturized body, thereby limiting reduction of ESL.

Even if sufficient space is ensured for formation of the terminal electrodes, furthermore, the distance between adjacent terminal electrodes will decrease to greatly increase the risk of short-circuit failure between the terminal electrodes, for example, due to failure caused by plating elongation during electroplating of the terminal electrodes.

SUMMARY OF THE INVENTION

It is an object of the present invention to provide a multi-terminal laminated ceramic capacitor with low ESL.

It is another object of the present invention to provide a laminated ceramic capacitor with excellent manufacturing yield.

It is still another object of the present invention to provide a laminated ceramic capacitor with high reliability.

In order to attain at least one of the above objects, the present invention provides a laminated ceramic capacitor comprising a body and a plurality of terminal electrodes. The body has an inner layer portion and an outer layer portion. The inner layer portion has a plurality of internal electrodes stacked in a height direction of the body. The internal electrodes have led-out portions led out to a side face of the body. The outer layer portion is disposed on one of opposite faces of the inner layer portion in the height direction. The terminal electrodes are spaced apart from each other in a length direction of the body.

In addition to the above-described basic structure of a laminated ceramic capacitor, the present invention is characterized in that the terminal electrodes are each provided with a connecting portion and a spreading portion, the connecting portion extends along the height direction to cover corresponding one of the led-out portions, and the spreading portion has a width gradually increasing from one of opposite ends of the connecting portion in the height direction toward an edge of the side face.

In this configuration, the spreading portion of the terminal electrode, which has a larger width than the connecting portion, enables further reduction of ESL of the terminal electrode in a miniaturized laminated ceramic capacitor, thereby improving the high-frequency characteristic of the capacitor.

In such a miniaturized laminated ceramic capacitor, moreover, the connecting portion of the terminal electrode, which has a smaller width than the spreading portion and may be a waist of an hourglass-shape, ensures a sufficient distance between terminal electrodes adjacent each other in the length direction. This prevents short-circuit failure between the adjacent terminal electrodes, for example, due to failure caused by plating elongation during electroplating of the terminal electrodes.

In one embodiment, the spreading portion may have a maximum width at the edge of the side face. When the laminated ceramic capacitor is mounted on a substrate, for example, this ensures a sufficient area for solder adhesion to the spreading portion, thereby improving the soldering strength (or reliability) and the manufacturing yield.

When the laminated ceramic capacitor is soldered to the substrate, moreover, the spreading portion having a maximum width at the edge of the side face can disperse stresses on the solder. This avoids the occurrence of solder cracks due to a heat cycle, improving the reliability.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
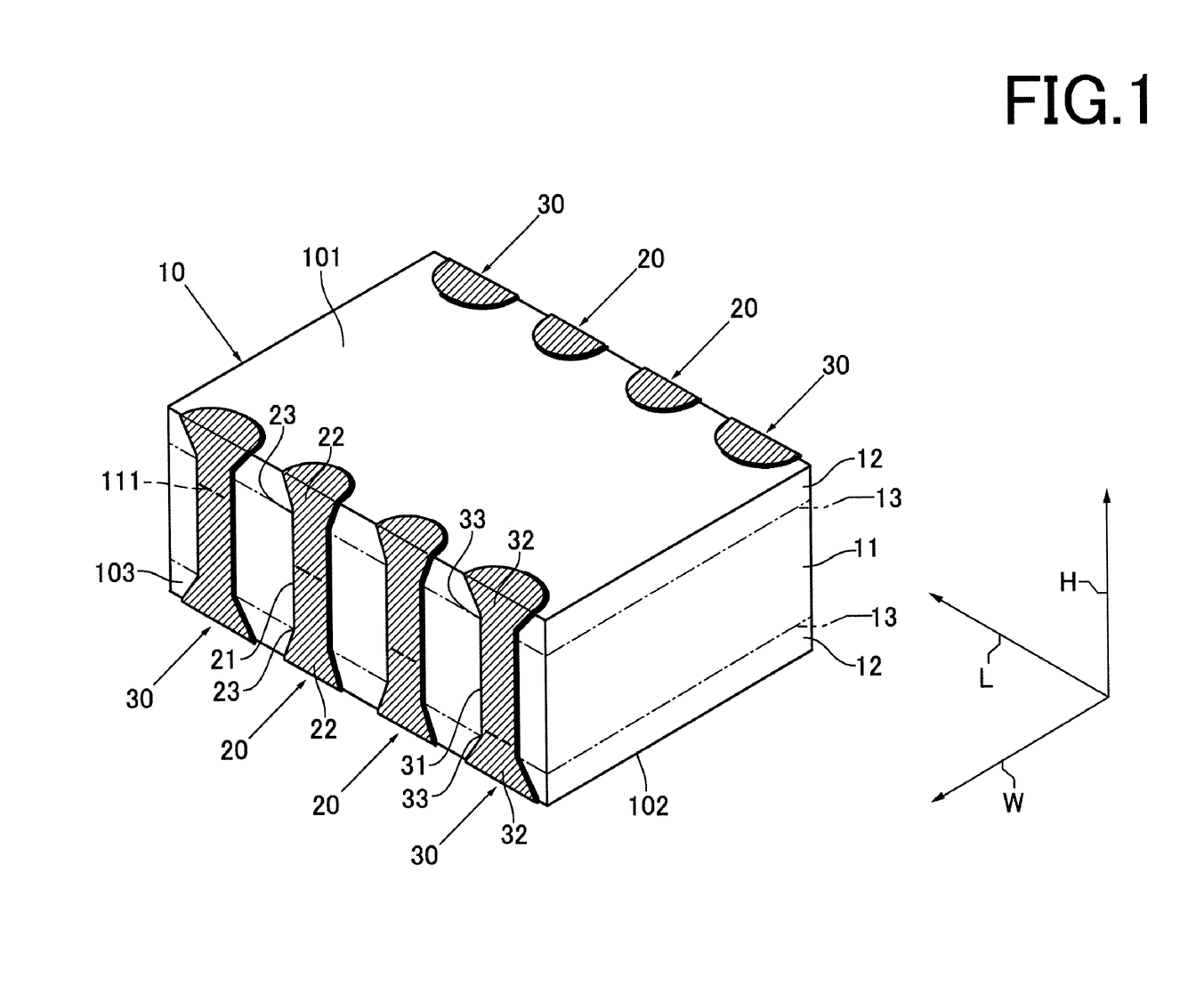
FIG. 1 is a perspective view of a laminated ceramic capacitor according to one embodiment of the present invention.
Figure 2:
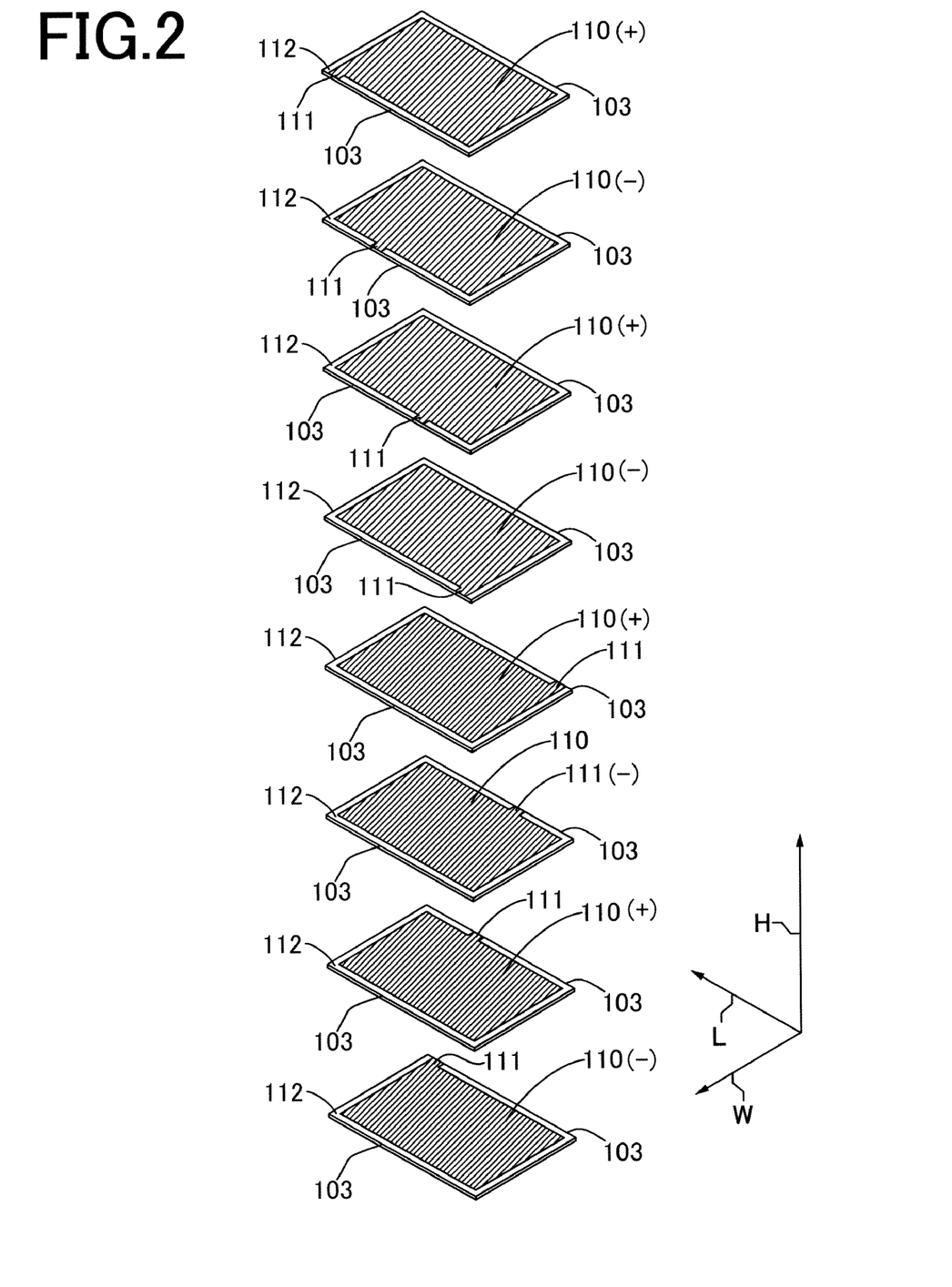
FIG. 2 is an exploded perspective view showing a layered structure of an inner layer portion of the laminated ceramic capacitor shown in FIG. 1.
Figure 3:
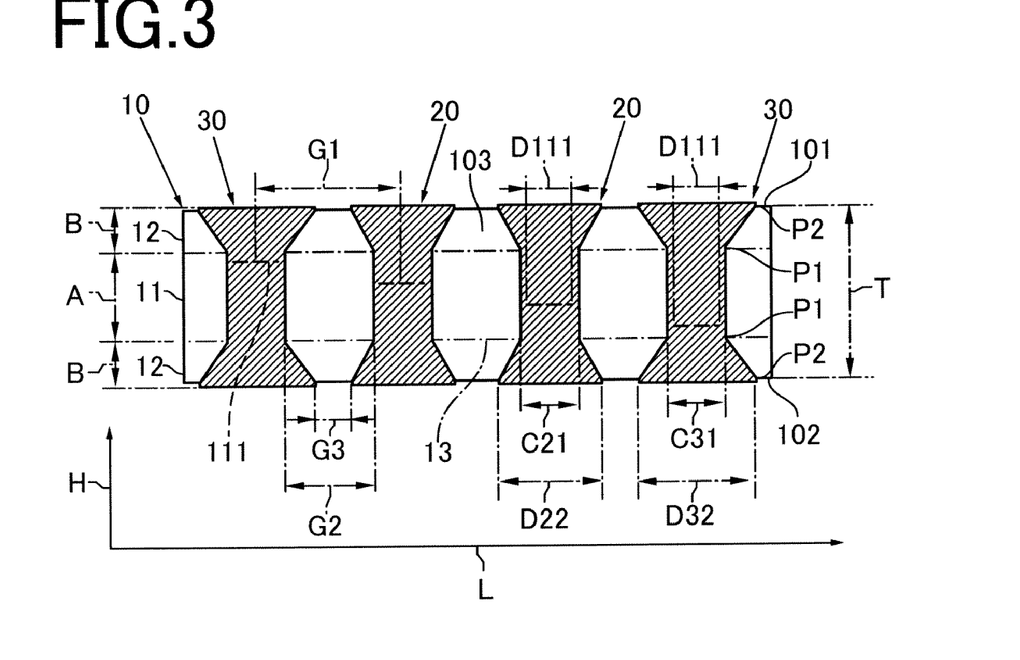
FIG. 3 is a left side view of the laminated ceramic capacitor shown in FIG. 1.

In a laminated ceramic capacitor shown in FIGS. 1 to 3, a body 10 is a hexahedron having one face 101 and another face 102 opposite from the face 101 in a height direction H. The body 10 has a height T and is composed of inner and outer layer portions 11 and 12.

The inner layer portion 11 is formed by stacking a predetermined number of dielectric layers 112 in the height direction H, wherein the dielectric layer 112 is mainly composed of a ceramic material and an internal electrode 110 mainly composed of a conductive metallic material is patterned on one surface of the dielectric layer 112. In order to realize low ESL, it is preferred that the polarity is different between adjacent ones of the internal electrodes 110 in the height direction H.

Each internal electrode 110 has at least one led-out portion 111 that is used as a so-called "extraction electrode". The led-out portion 111 is led out to at least one of two opposite side faces 103 of the body 10 in a width direction W.

Between the adjacent internal electrodes 110 in the height direction H, the led-out portions 111 are spaced at an interval G1 in a length direction L of the body 10 perpendicular to the height direction H (see FIG. 3). The interval G1 is a center-to-center distance between the adjacent led-out portions 111, where the center of each led-out portion 111 refers to the midpoint of an electrode width D111.

On both faces of the inner layer portion 11 which oppose each other in the height direction H, the outer layer portion 12 is preferably formed by stacking only a predetermined number of the dielectric layers 112 in the height direction H. In the body 10 shown in FIGS. 1 to 3, accordingly, the inner layer portion 11 is sandwiched by two outer layer portions 12 from above and below in the height direction H, wherein outwardly-directed faces of the outer layer portions 12 are designated by 101 and 102, respectively. With this configuration, the laminated ceramic capacitor can be mounted regardless of its direction or which one of the faces 101 and 102 is used as a substrate mounting face.

Furthermore, the laminated ceramic capacitor shown in FIGS. 1 to 3 has first terminal electrodes 20 and second terminal electrodes 30. Both the first and second terminal electrodes 20 and 30 are mainly composed of a conductive metallic material and extend continuously along the height direction H to cover the led-out portions 111 on the side faces 103.

The first and second terminal electrodes 20 and 30 are spaced by distances G2 and G3 in the length direction L. In order to realize low ESL, it is preferred that the polarity is different between adjacent ones of the first and second terminal electrodes 20 and 30 in the length direction L.

In addition to the above-described basic structure of a multi-terminal laminated ceramic capacitor, the laminated ceramic capacitor shown in FIGS. 1 to 3 is characterized in that the first and second terminal electrodes 20 and 30 have a unique shape. Hereinbelow the concrete structure of the first and second terminal electrodes 20 and 30 will be described mainly with reference to FIG. 3.

First of all, the first terminal electrode 20 has spreading portions 22 on opposite ends of a connecting portion 21 in the height direction H. The connecting portion 21 has an electrode width C21, which is larger than the electrode width D111 of the led-out portion 111, and extends generally linearly along the height direction H in an area of the side face 103 corresponding to the inner layer portion 11, thereby covering the led-out portion 111. With the electrode width C21 being larger than the electrode width D111, for example, an offset generated between the connecting portion 21 and the led-out portion 111 upon formation of the first terminal electrode 20 can be accommodated by the width difference (or margin) therebetween, avoiding the problem of exposure of the led-out portion 111 out of the connecting portion 21.

The spreading portion 22 is gradually widened from one end of the connecting portion 21 toward an edge of the side face 103. More specifically, the spreading portion 22 lies in an area of the side face 103 corresponding to the outer layer portion 12 and has a fan-shape with a maximum electrode width D22 at the edge of the side face 103, wherein a width change starting point P1 is located at a boundary 13 between the inner layer portion 11 and the outer layer portion 12 and a width change ending point P2 is located at the edge of the side face 103. In the first terminal electrode 20 shown in FIGS. 1 to 3, the boundary 13 between the inner layer portion 11 and the outer layer portion 12 almost coincides with a boundary 23 between the connecting portion 21 and the spreading portion 22.

The first terminal electrode 20 is of an hourglass shape with its waist at the connecting portion 22, wherein the electrode width C21 at the starting point P1 is relatively small as compared with the electrode width D22 at the ending point P2.

On the other hand, the second terminal electrode 30 has spreading portions 32 on opposite ends of a connecting portion 31 in the height direction H. The connecting portion 31 has an electrode width C31, which is larger than the electrode width D111 of the led-out portion 111, and extends generally linearly along the height direction H in an area of the side face 103 corresponding to the inner layer portion 11, thereby covering the led-out portion 111. With the electrode width C31 being larger than the electrode width D111, for example, an offset generated between the connecting portion 31 and the led-out portion 111 upon formation of the second terminal electrode 30 can be accommodated by the width difference (or margin) therebetween, avoiding the problem of exposure of the led-out portion 111 out of the connecting portion 31.

The spreading portion 32 is gradually widened from one end of the connecting portion 31 toward an edge of the side face 103. More specifically, the spreading portion 32 lies in an area of the side face 103 corresponding to the outer layer portion 12 and has a fan-shape with a maximum electrode width D32 at the edge of the side face 103, wherein a width change starting point P1 is located at the boundary 13 between the inner layer portion 11 and the outer layer portion 12 and a width change ending point P2 is located at the edge of the side face 103. In the second terminal electrode 30 shown in FIGS. 1 to 3, the boundary 13 between the inner layer portion 11 and the outer layer portion 12 almost coincides with a boundary 33 between the connecting portion 31 and the spreading portion 32.

The second terminal electrode 30 is of an hourglass shape with its waist at the connecting portion 31, wherein the electrode width C31 at the starting point P1 is relatively small as compared with the electrode width D32 at the ending point P2.

Next will be described an ESL-reducing effect of a laminated ceramic capacitor according to one embodiment of the present invention with reference to FIGS. 4 to 6.

Figure 4:
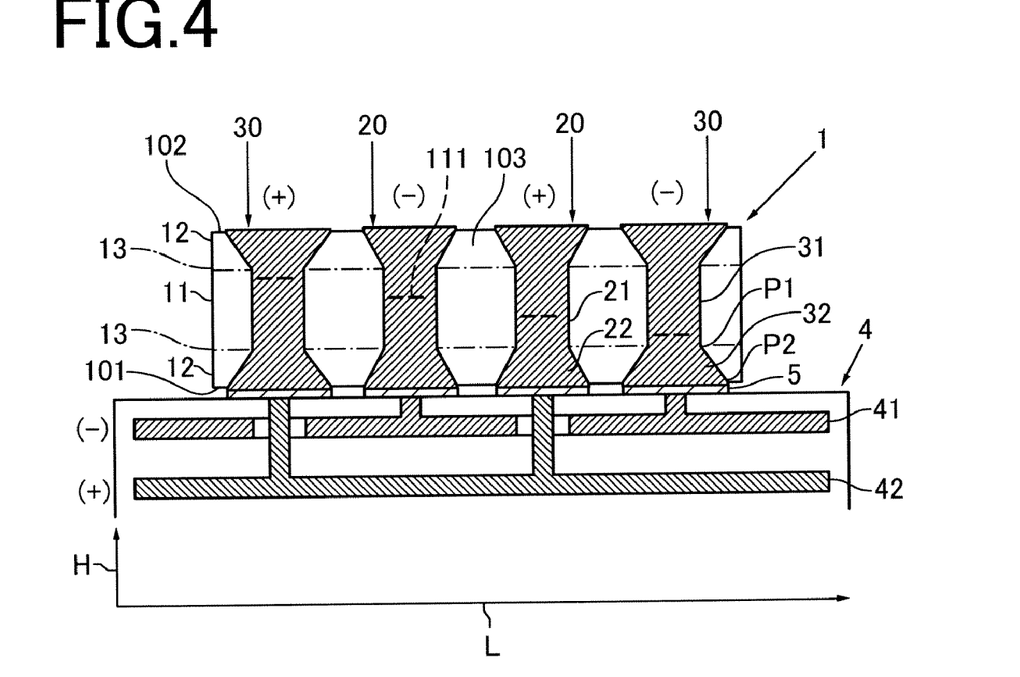
FIG. 4 is a partially sectional view of an electronic device with a laminated ceramic capacitor according to one embodiment of the present invention.

In an electronic device shown in FIG. 4, the first and second terminal electrodes 20 and 30 of a laminated ceramic capacitor 1 are secured to a substrate 4 through solder layers 5, wherein the joining of the first and second terminal electrodes 20 and 30 to the solder layers 5 electrically connects circuit patterns 41 and 42 to the internal electrodes 110. The circuit patterns 41 and 42 have opposite polarities and are electrically connected to the first and second terminal electrodes 20 and 30 depending on their polarities.

An ESL-reducing effect of the terminal electrode when applying current to the electronic device of FIG. 4 under the conditions of Table 1 will be described with reference to Table 1 and FIG. 5 where the data of Table 1 are plotted. It should be noted that although description will be made of the first terminal electrode 20 for convenience sake, the ESL values shown in Table 1 and FIG. 5 are also true of the second terminal electrode 30.

TABLE 1

| T(μm) | A(μm) | B(μm) | B/A | ESL values (pH) |
|---|---|---|---|---|
| 500 | 410 | 45.0 | 0.10 | 82 |
| 500 | 350 | 75.0 | 0.21 | 78 |
| 500 | 280 | 110.0 | 0.39 | 69 |
| 500 | 227 | 136.5 | 0.60 | 63 |
| 500 | 194 | 153.0 | 0.78 | 62 |
| 500 | 143 | 178.5 | 1.24 | 61 |
| 500 | 58 | 221.0 | 3.81 | 61 |

Figure 5:
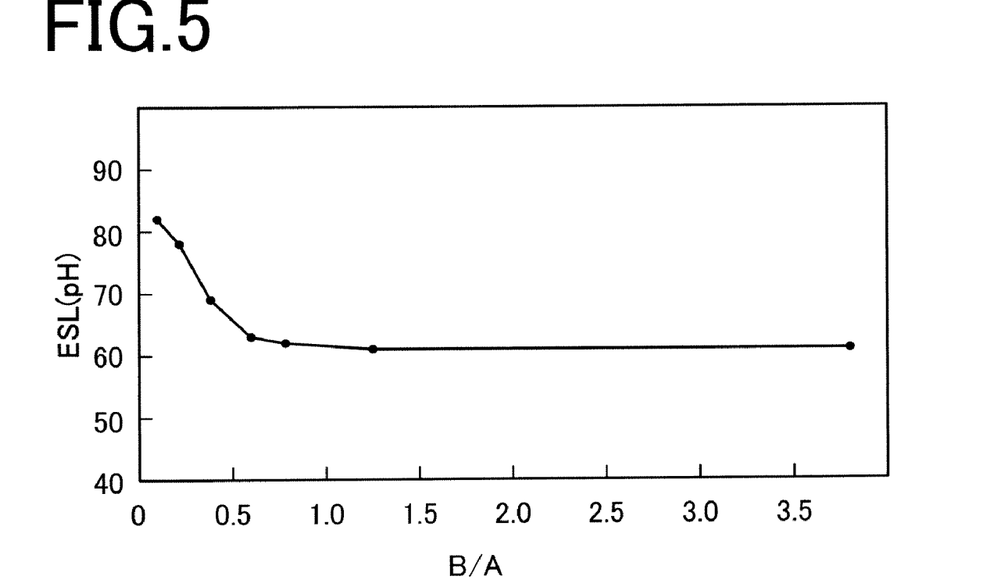
FIG. 5 is a diagram showing experimental data on a laminated ceramic capacitor according to one embodiment of the present invention.

It is seen from Table 1 and FIG. 5 that ESL of the first terminal electrode 20 decreased almost in adverse proportion to increase from 0.10 to 0.60 of the height ratio B/A of the spreading portion 22 to the connecting portion 21, but was kept nearly constant, regardless of increase of the height ratio B/A, when the height ratio B/A was greater than 0.60. In order to reduce ESL of the first terminal electrode 20, accordingly, it is desirable to set the height ratio B/A as follows: $0.60 \leq B/A$. Although the concrete height B of the spreading portion 22 varies with the height T of the body 10, if the height T is 500 μm, for example, the height B may be set as follows:

$$136.5 \ \mu m \leq B.$$

Another ESL-reducing effect when applying current to the electronic device of FIG. 4 will be described with reference to Table 2 and FIG. 6 where the data of Table 2 are plotted. It should be noted that although description will be made of the first terminal electrode 20 for convenience sake, the ESL values shown in Table 2 and FIG. 6 are also true of the second terminal electrode 30 with the electrode width ratio C21/D22 being replaced by the electrode width ratio C31/D32.

TABLE 2

| G1(μm) | C21(μm) | D22(μm) | C21/D22 | ESL values (pH) |
|---|---|---|---|---|
| 500 | 252 | 252 | 1.00 | 80 |
| 500 | 250 | 271 | 0.92 | 76 |
| 500 | 249 | 293 | 0.85 | 69 |
| 500 | 251 | 315 | 0.80 | 63 |
| 500 | 250 | 341 | 0.73 | 62 |
| 500 | 252 | 377 | 0.67 | 61 |
| 500 | 249 | 405 | 0.61 | 61 |

Figure 6:
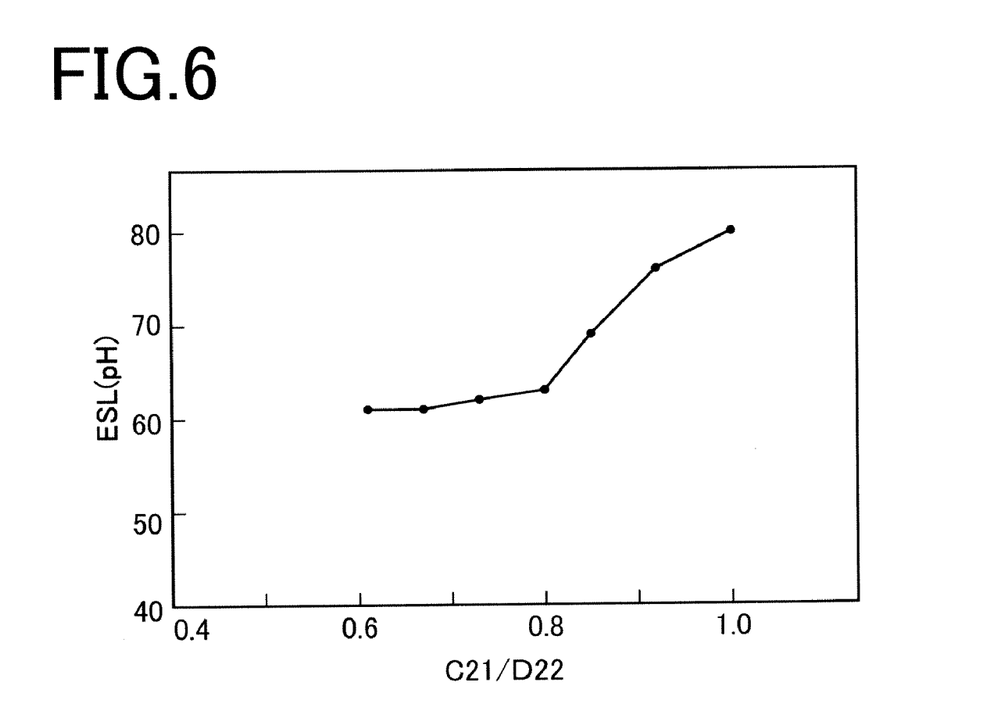
FIG. 6 is a diagram showing experimental data on a laminated ceramic capacitor according to one embodiment of the present invention.

It is seen from Table 2 and FIG. 6 that ESL of the first terminal electrode 20 increased almost in proportion to increase from 0.61 to 0.80 of the electrode width ratio C21/D22, i.e., the ratio of the electrode width C21 to the maximum electrode width D22, but sharply increased after the critical point where the electrode width ratio C21/D22 was 0.80 and ESL was 63. In order to reduce ESL of the first terminal electrode 20, accordingly, it is desirable to set the electrode width ratio C21/D22 as follows: $C21/D22 \leq 0.80$. Although the concrete maximum electrode width D22 varies with the interval G1 between adjacent terminal electrodes, if the interval G1 is 500 μm, for example, the maximum electrode width D22 may be set as follows: $315 \ \mu m \leq D22$.

In the laminated ceramic capacitor 1 described above with reference to FIGS. 1 to 6, since the first and second terminal electrodes 20 and 30 have a fan-shape of which the electrode width D22, D32 of the spreading portion 22, 32 at the ending point P2 is larger than the electrode width C21, C31 of the connecting portion 21, 31 at the starting point P1, ESL of the first and second terminal electrodes 20 and 30 can be reduced to thereby improve the high-frequency characteristic of the capacitor.

When securing the spreading portions 22 and 32 to the substrate 4, moreover, the fan-shape ensures a sufficient contact area with the solder layer 5. This provides the laminated ceramic capacitor 1 with excellent manufacturing yield.

After being secured to the substrate 4, furthermore, the fan-shape widely disperses stresses on the solder layer 5. This avoids the occurrence of solder cracks due to a heat cycle, providing the laminated ceramic capacitor 1 with high reliability.

On the other hand, the connecting portions 21 and 31 corresponding to the inner layer portion 11 are narrower than the spreading portions 22 and 32 corresponding to the outer layer portions 12, like a waist of an hourglass-shape. With this configuration, the first and second terminal electrodes 20 and 30 adjacent each other in the length direction L are arranged such that the connecting portions 21 and 31 are spaced by the distance G2, while the spreading portions 22 and 32 are spaced by the distance G3 at the ending point P2. Because of the hourglass shape of the first and second terminal electrodes 20 and 30, the distances G2 and G3 satisfy G3<G2. This ensures a sufficient distance G2 between the connecting portions 21 and 31 in the area corresponding to the inner layer portion 11, avoiding not only failure caused by plating elongation during electroplating of the terminal electrodes but also short-circuit failure between the first and second terminal electrodes 20 and 30. Specific values of the distance G2 which contribute to avoid the plating elongation failure will be described with reference to Table 3.

TABLE 3

| G1 (μm) | C21 (μm) | D22 (μm) | C21/D22 | G2 (μm) | ESL values (pH) | plating elongation failure |
|---|---|---|---|---|---|---|
| 500 | 252 | 377 | 0.67 | 123 | 61 | 0/500 |
| 500 | 249 | 405 | 0.61 | 95 | 61 | 0/500 |

In the laminated ceramic capacitor 1 having the interval G1 of 500 μm, as shown in Table 3, when the electrode width C21 of the connecting portion 21 was 252 μm, the maximum electrode width D22 of the spreading portion 22 was 377 μm, and the electrode width ratio C21/D22 was 0.67, the plating elongation failure could be avoided by setting the distance G2 at 123 μm while keeping ESL below 63 pH.

On the other hand, when the electrode width C21 of the connecting portion 21 was 249 μm, the maximum electrode width D22 of the spreading portion 22 was 405 μm, and the electrode width ratio C21/D22 was 0.61, the plating elongation failure could be avoided by setting the distance G2 at 95 μm while keeping ESL below 63 pH.

In the prior art such as Japanese Unexamined Patent Application Publication No. 2000-208361, contrarily, since the first and second terminal electrodes 20 and 30 extend along the height direction H with a constant electrode width (G2=G3), if the electrode width increases, the distance between adjacent terminal electrodes (G2=G3) will decrease at any part of the first and second terminal electrodes 20 and 30, thereby increasing the risk of short-circuit failure due to plating elongation during electroplating of the terminal electrodes. Particularly, in light of the current situation that because of the current demand for miniaturization of laminated ceramic capacitors, it is basically difficult to ensure sufficient space for formation of the first and second terminal electrodes 20 and 30 on the side faces 103, the problem of short-circuit failure is becoming more prominent.

Figure 7:
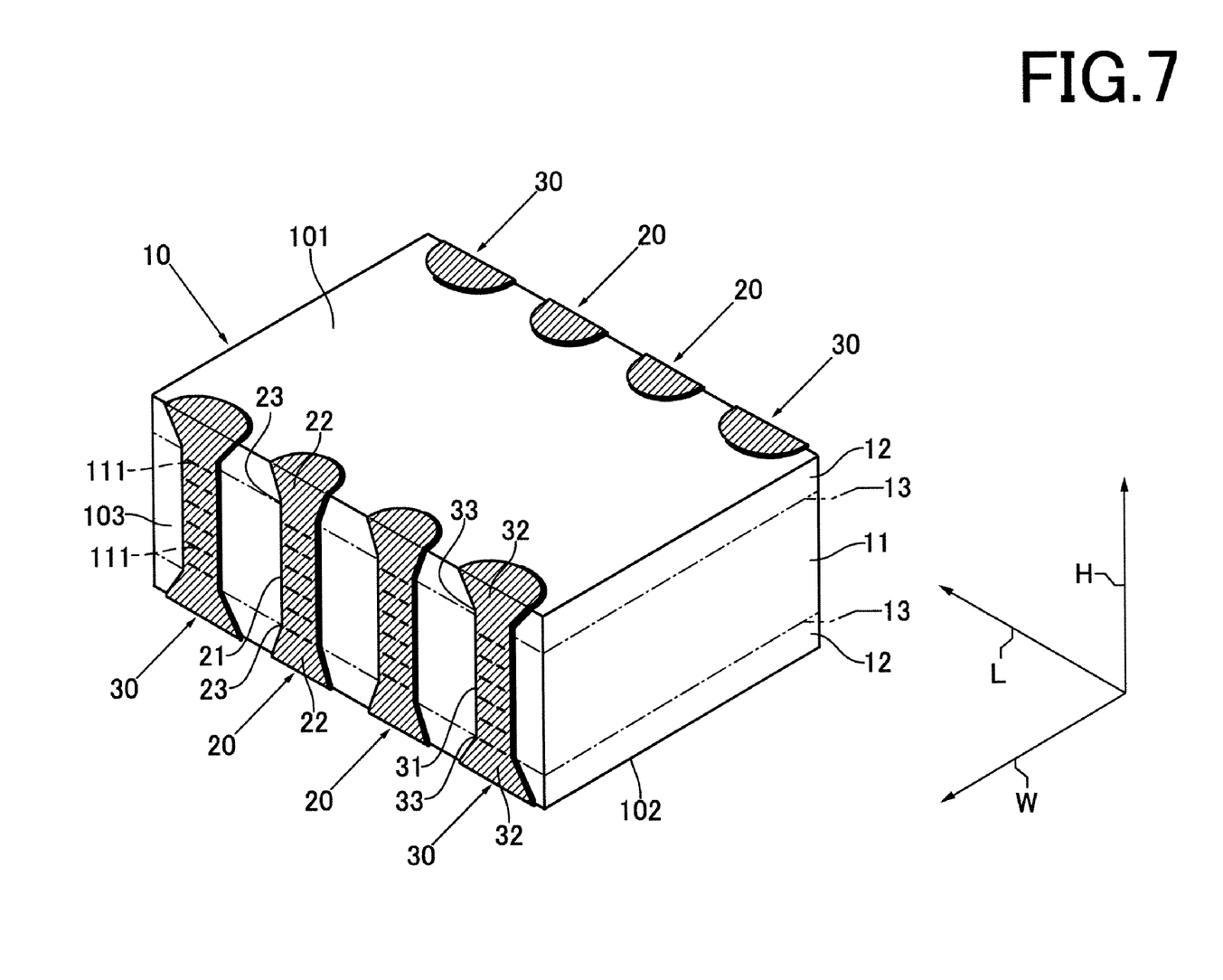
FIG. 7 is a perspective view of a laminated ceramic capacitor according to another embodiment of the present invention.
Figure 8:
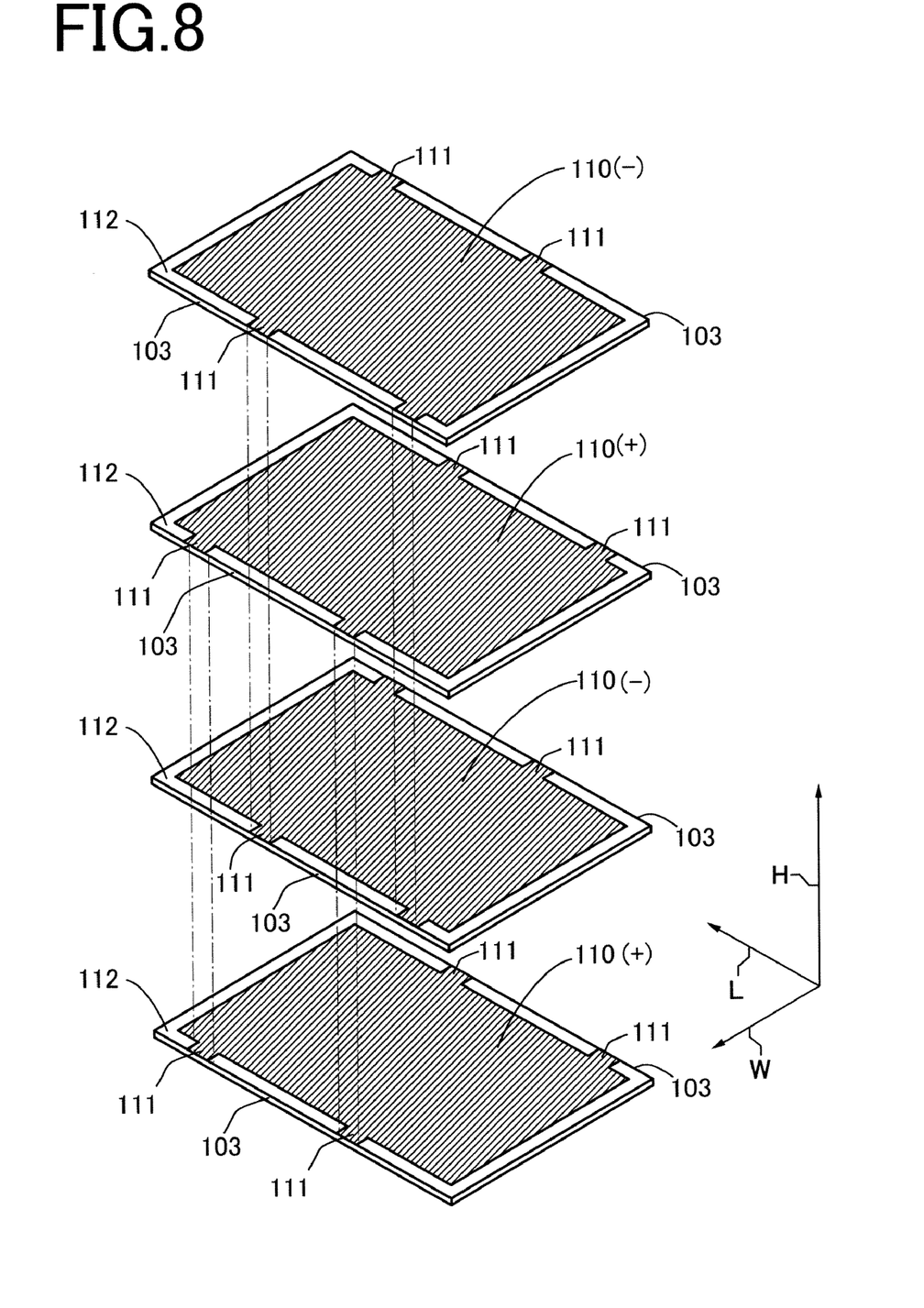
FIG. 8 is an exploded perspective view showing a layered structure of an inner layer portion of the laminated ceramic capacitor shown in FIG. 7.
Figure 9:
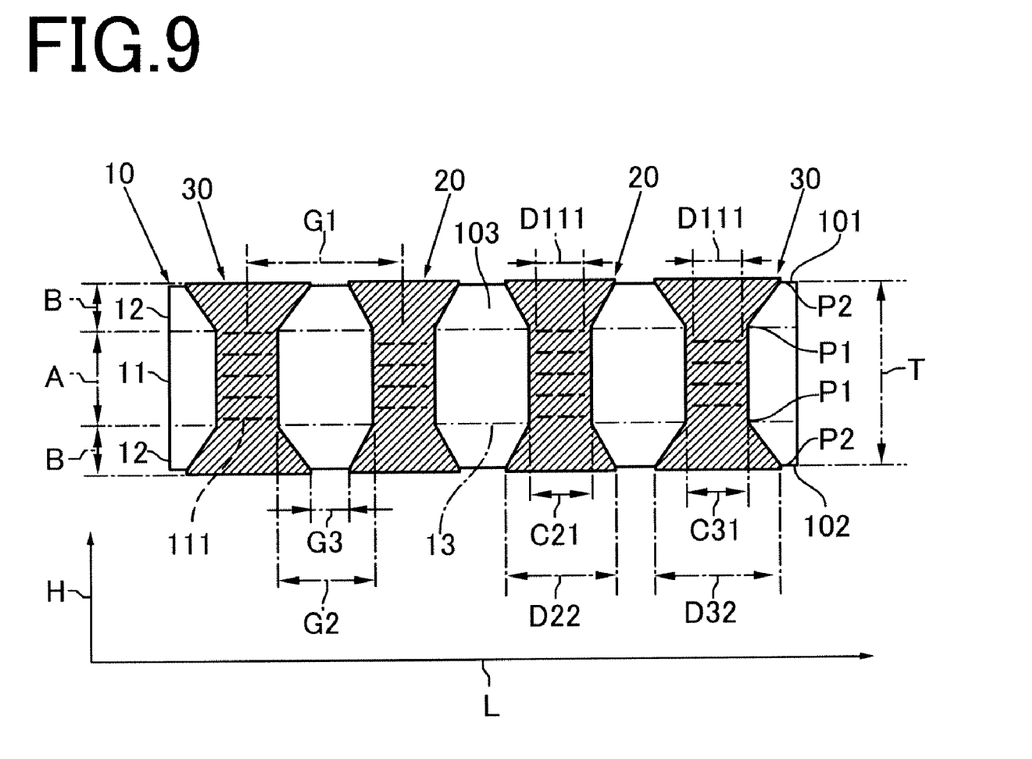
FIG. 9 is a left side view of the laminated ceramic capacitor shown in FIG. 8.

FIGS. 7 to 9 show a laminated ceramic capacitor according to another embodiment of the present invention, wherein the internal electrode 110 has four led-out portions 111, two of which can be led out to one of the side faces 103 opposing each other in the width direction W. With this configuration, the internal electrodes can be led out in a variety of ways while providing the laminated ceramic capacitor with all the advantages described with reference to FIGS. 1 to 6.

While the present invention has been particularly shown and described with reference to embodiments thereof, it will be understood by those skilled in the art that various changes in form and detail may be made therein without departing from the spirit, scope and teaching of the invention.

What is claimed is:

1. A laminated ceramic capacitor comprising a body and a plurality of terminal electrodes,
   wherein said body has an inner layer portion and an outer layer portion,
   said inner layer portion has a plurality of internal electrodes stacked in a height direction of said body,
   said internal electrodes have led-out portions led out to a side face of said body,
   said outer layer portion is disposed on one of opposite faces of said inner layer portion in said height direction,
   said terminal electrodes are each provided with a connecting portion and a spreading portion,
   said connecting portion extends along said height direction to cover corresponding one of said led-out portions,
   said spreading portion has a width gradually increasing from one of opposite ends of said connecting portion in said height direction toward an edge of said side face, and
   said terminal electrodes are spaced apart from each other in a length direction of said body.

2. The laminated ceramic capacitor of claim 1, wherein said spreading portion has a fan-shape of which a width change starting point is located in a vicinity of a boundary between said inner and outer layer portions and a width change ending point is located at said edge of said side face.

3. The laminated ceramic capacitor of claim 2, wherein two said outer layer portions are disposed on said opposite faces of said inner layer portion in said height direction.

4. The laminated ceramic capacitor of claim 3, wherein two said spreading portions are disposed on said opposite ends of said connecting portion in said height direction.

5. The laminated ceramic capacitor of claim 3, which satisfies:

$$0.60 \leq B/A,$$

where A represents a height of said connecting portion, and B represents a height of said spreading portion.

6. The laminated ceramic capacitor of claim 3, which satisfies:

$$0 < C/D \leq 0.80,$$

where C represents an electrode width of said terminal electrode at said end of said connecting portion, and D represents an electrode width of said terminal electrode at said edge of said side face.

7. The laminated ceramic capacitor of claim 2, wherein two said spreading portions are disposed on said opposite ends of said connecting portion in said height direction.

8. The laminated ceramic capacitor of claim 7, which satisfies:

$$0.60 \leq B/A,$$

where A represents a height of said connecting portion, and B represents a height of said spreading portion.

9. The laminated ceramic capacitor of claim 7, which satisfies:

$$0 < C/D \leq 0.80,$$

where C represents an electrode width of said terminal electrode at said end of said connecting portion, and D represents an electrode width of said terminal electrode at said edge of said side face.

10. The laminated ceramic capacitor of claim 2, which satisfies:

$$0.60 \leq B/A,$$

where A represents a height of said connecting portion, and B represents a height of said spreading portion.

11. The laminated ceramic capacitor of claim 2, which satisfies:

$$0 < C/D \leq 0.80,$$

where C represents an electrode width of said terminal electrode at said end of said connecting portion, and D represents an electrode width of said terminal electrode at said edge of said side face.

12. The laminated ceramic capacitor of claim 1, wherein two said outer layer portions are disposed on said opposite faces of said inner layer portion in said height direction.

13. The laminated ceramic capacitor of claim 12, wherein two said spreading portions are disposed on said opposite ends of said connecting portion in said height direction.

14. The laminated ceramic capacitor of claim 12, which satisfies:

$$0.60 \leq B/A,$$

where A represents a height of said connecting portion, and B represents a height of said spreading portion.

15. The laminated ceramic capacitor of claim 12, which satisfies:

$$0 < C/D \leq 0.80,$$

where C represents an electrode width of said terminal electrode at said end of said connecting portion, and D represents an electrode width of said terminal electrode at said edge of said side face.

16. The laminated ceramic capacitor of claim 1, wherein two said spreading portions are disposed on said opposite ends of said connecting portion in said height direction.

17. The laminated ceramic capacitor of claim 16, which satisfies:

$$0.60 \leq B/A,$$

where A represents a height of said connecting portion, and B represents a height of said spreading portion.

18. The laminated ceramic capacitor of claim 16, which satisfies:

$$0 < C/D \leq 0.80,$$

where C represents an electrode width of said terminal electrode at said end of said connecting portion, and D represents an electrode width of said terminal electrode at said edge of said side face.

19. The laminated ceramic capacitor of claim 1, which satisfies:

$$0.60 \leq B/A,$$

where A represents a height of said connecting portion, and B represents a height of said spreading portion.

20. The laminated ceramic capacitor of claim 1, which satisfies:

$$0 < C/D \leq 0.80,$$

where C represents an electrode width of said terminal electrode at said end of said connecting portion, and D represents an electrode width of said terminal electrode at said edge of said side face.

* * * * *